United States Patent [19]

Gelbart

[11] Patent Number: 5,291,273
[45] Date of Patent: Mar. 1, 1994

[54] NON-CONTACT DIAMETER MEASURING METHOD AND APPARATUS

[75] Inventor: Daniel Gelbart, Vancouver, Canada
[73] Assignee: Creo Products Inc., Burnaby, Canada
[21] Appl. No.: 47,537
[22] Filed: Apr. 19, 1993
[51] Int. Cl.$^5$ .................. G01B 11/02; G01B 11/10; G01N 21/86
[52] U.S. Cl. .................. 356/384; 356/386; 356/387; 250/560
[58] Field of Search .................. 356/384–387, 356/73.1, 355–357, 375, 346, 124; 250/560, 561; 364/562, 563

[56] References Cited

U.S. PATENT DOCUMENTS

| | | | |
|---|---|---|---|
| 3,922,094 | 11/1975 | Colding et al. | 356/375 |
| 3,977,789 | 8/1976 | Hunter et al. | 356/124 |
| 4,227,812 | 10/1980 | Pirlet | 356/387 |
| 4,748,332 | 5/1988 | Kühne et al. | 356/386 |
| 4,866,642 | 9/1989 | Obrig et al. | 356/384 |
| 4,880,991 | 11/1989 | Boehnlein et al. | 356/346 |
| 4,931,658 | 6/1990 | Tole | 356/386 |
| 5,118,954 | 6/1992 | Grosso | 356/386 |
| 5,175,595 | 12/1992 | Fukase | 356/386 |

Primary Examiner—Richard A. Rosenberger
Assistant Examiner—Hoa Q. Pham

[57] ABSTRACT

A non-contact diameter measuring device measures the diameter of a stationary or rotating round object by measuring the difference in the angle of reflection of a light beam scanned along part of the circumference of the object. The scanning beam is repeatedly translated across the object and the angle of the reflected beam is detected at two locations using two angle-sensitive detector detects the position at which the scanning beam is retroreflected (i.e. pointing to the center of the object). The second detector is set at a fixed angle. The distance the beam has to translate across the object to generate the maximum output signal at the two angle sensitive detectors is inversely proportional to the diameter. The diameter is calculated from knowing this distance and the fixed angle between the two detectors. The main advantage of this method is that only a small part of the circumference is required to measure the diameter, thus a wide range of diameters can be covered by a single device.

4 Claims, 2 Drawing Sheets

NON-CONTACT DIAMETER MEASURING METHOD AND APPARATUS

BACKGROUND OF THE INVENTION

The present invention relates to diameter measuring method and specifically to non-contact measurement of the diameter of a round object.

Existing diameter gages can be broadly divided into contact and non contact types. The most desirable gage is a non-contact type which can measure the diameter without requiring to straddle the measured object. Prior art devices not straddling the object are of the contact type, for example U.S. Pat. Nos. 3,172,208; 3,656,239 and 4,700,484. All these patents utilize a wheel which comes in contact with a rotating object. The wheel has to be carefully aligned with the object to achieve high accuracy. These gages can only measure rotating objects. Most prior art optical gaging, which is non-contact, have to straddle the object, for example U.S. Pat. Nos. 3,922,094 and 4,880,991. There are a few non-contact methods which only require access to one side of the object, such as U.S. Pat. No. 4,473,750, however, they require an accurate distance and angle between the gage and the object and are not suitable to cover a wide range of curvatures. Curvature measurements using two parallel beams can only be used when beams are approximately at a constant angle to the surface of the cylinder. In a hand-held device, these angles can not be controlled.

SUMMARY OF THE INVENTION

The primary object of this invention is a device for non-contact measurements of both rotating and stationary round objects requiring access only to a fraction of the circumference. A secondary object is a device covering a wide range of diameters in a single device. A further object is to make the device hand-held while maintaining high accuracy. Still another object is to maintain high accuracy of diameter measurements without being affected by the color and surface finish of the measured object.

In order to achieve the above objects, a light beam is scanned along part of the circumference of the object. The scanning beam is translated (i.e.: the beam stays parallel to the starting position) across the object and the angle of the reflected beam is detected at two locations using two angle sensitive detectors. The first angle sensitive detector detects the position at which the scanning beam is retroreflected. This is the point where the beam is orthogonal to the surface of the object (i.e.: pointing to the center). The second detector is set at a fixed angle. The distance the beam has to translate across the object to generate the maximum output at the two angle sensitive detectors is inversely proportional to the diameter. The diameter is calculated from knowing this distance and knowing the fixed angle between the two detectors.

Other features and objects of this invention will become apparent when considering the preferred embodiment in conjunction with the following drawings:

DETAILED DESCRIPTION OF THE PREFERRED EMBODIMENT

Figure 1:
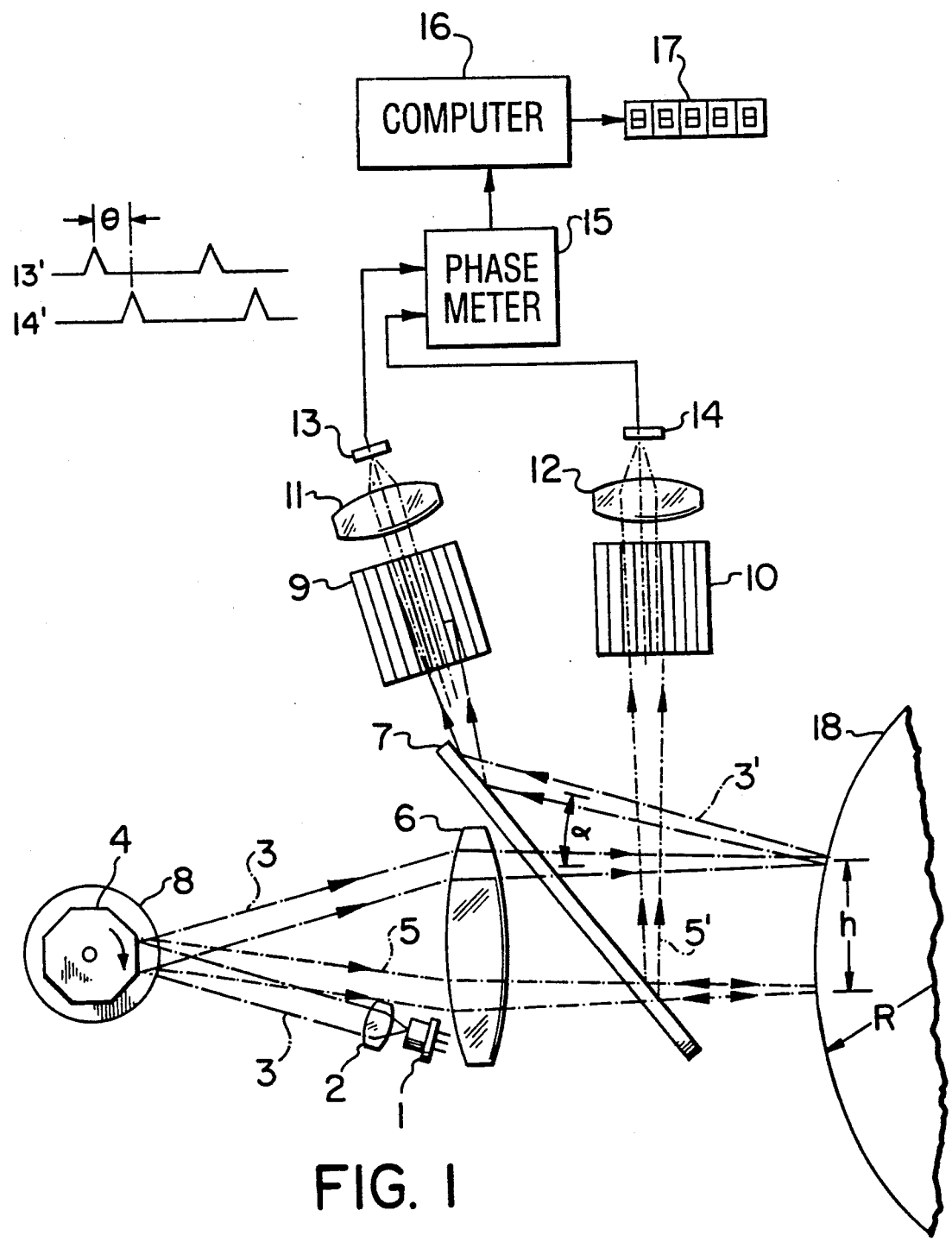
FIG. 1 is a schematic view of the invention

The preferred embodiment will now be described with reference to the accompanying drawings. An example of a device using the method of the present invention is shown in FIG. 1. A laser diode 1 generates a light beam 3 using lens 2. A polygon scanner 4, driven by motor 8 scans light beam 3 across the optical aperture of lens 6. If the distance between the reflecting faces of polygon 4 and the optical center of lens 6 is exactly equal to the focal length of lens 6, the scanned beam emerging from lens 6 will travel parallel to its original position. This type of scanning is known as telecentric scanning and is well known to those versed in the art. The combination of motor 8, polygon 4, laser diode 1 and lens 2 is very similar to the one used in laser printers and needs to further explanation. The scanned beam travels through a partial mirror 7 and impinges on a cylinder 18 at a distance shown as h from the centerline of 18, it will be reflected as beam 3' at an angle $\alpha$.

Figure 2:
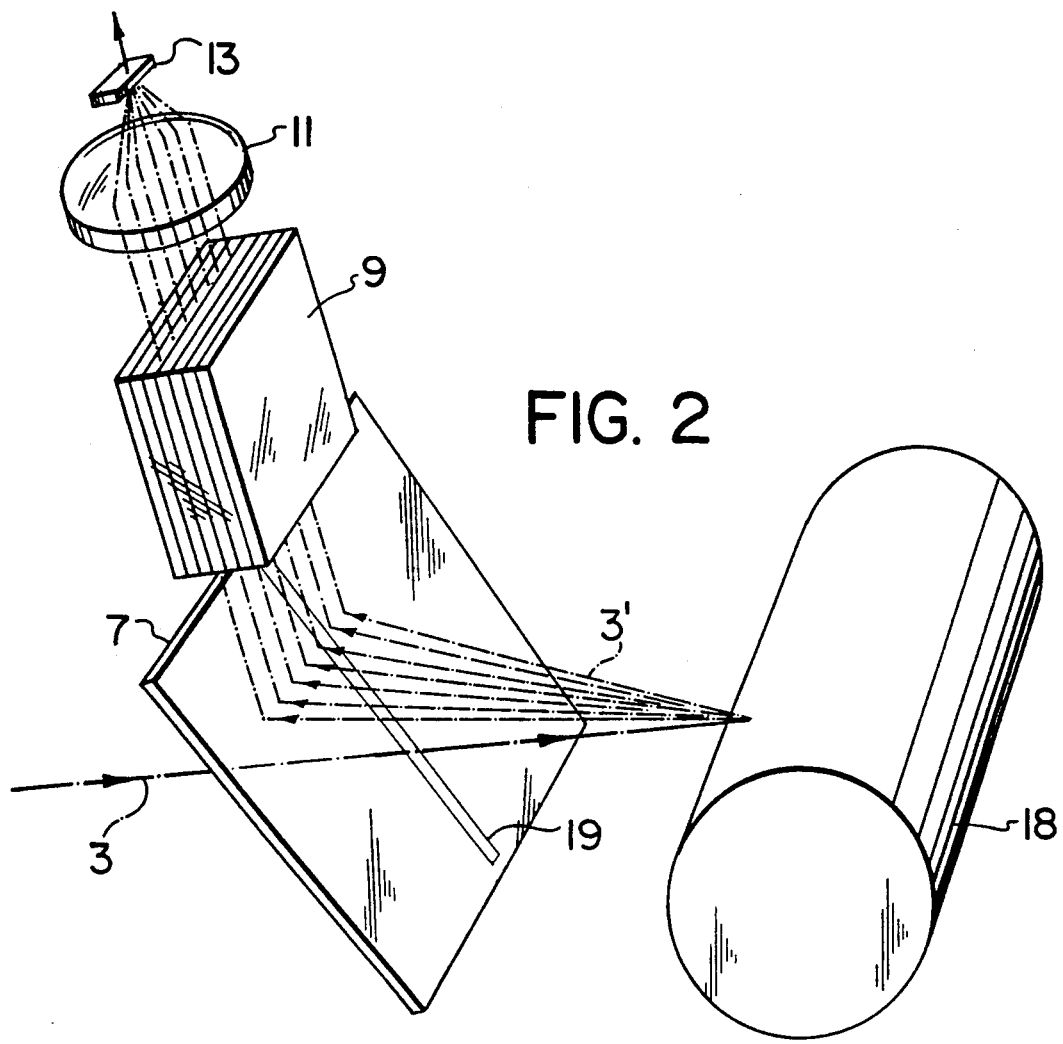
FIG. 2 is a perspective view of the angle sensitive detector

The relationship between h and the radius R of cylinder 18, is given by: $\sin \alpha/2 = h/R$. When $h=0$ $\alpha=0$ and this condition is shown by beam 5, reflected back as beam 5'. The reflected beams 3' and 5' pass through directional filters 9 and 10. Referring now to FIG. 1 together with FIG. 2, the reflected beam 3' passes through directional filter 9 and the output light from filter 9 is collected by lens 11 to detector 13. A similar collection of light consist of directional filter 10, lens 12 and detector 14. Since the surface finish of object 18, typically machining marks, will cause the returned beam to scatter into a wide fan of rays, shown as 3' in FIG. 2, the directional filters have to be wide to collect sufficient energy. Taking advantage of the wide reflected beam mirror 7 in FIG. 2 is fully reflective except for a narrow transparent strip 19. This narrow transparent strip allows beam 3 to pass through, while most of the reflected beam 3' is reflected again by mirror 7 towards directional filter 9.

Figure 3:
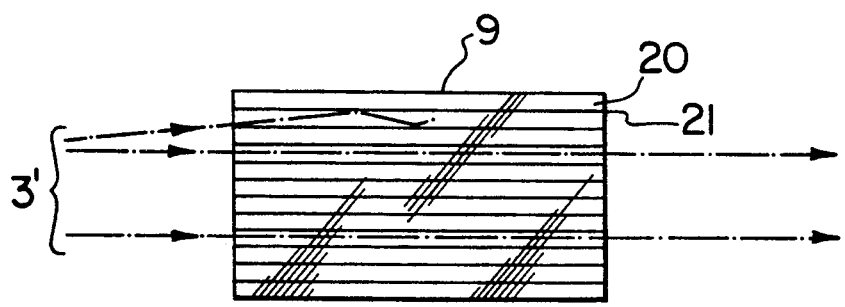
FIG. 3 is a cross-section of the angle sensitive detector

The operation of the directional filters is shown in FIG. 3. Filter 9 is laminated from a large number of transparent sheets 20 separated by a thin layer of light absorbing adhesive 21. By the way of example, layers 20 are polyester or PET sheet of about 100 micron thickness bonded together by an adhesive containing a black dye. Only light beams parallel to the lamination can get through, similar to the well known "Venetian blind" effect.

Referring back to FIG. 1, as beam 3 is scanned across object 18 light pulses will emerge from directional filters 9 and 10. At the position shown as beam 3' a light pulse will appear at detector 13. A short time after the beam will be at the position shown as 5' and a light pulse will appear at detector 14. These pulses will repeat as each facet of polygon 4 causes a new scan. The electrical waveforms generated by detectors 13 and 14 are shown as 13' and 14'. The phase shift $\theta$ between waveforms 13' and 14' will depend on the diameter R, since it is a function of h: $\theta = k \cdot R \cdot \sin(\alpha/2)$ (k=constant), thus the phase shift $\theta$ is proportional to the diameter of the measured object 18. This phase shift is measured by electronic phase-meter 15 and the result converted to a diameter read-out 17 by computer 16. Computer 16 also controls all other operating functions of the device, such as motor rotation, timing etc. The operation of computer 16 and phase meter 15 are well known to those versed in the art.

By the way of example, using a signal analyzer made by Hewelet-Packard company as a phase-meter (model 35665A), phase resolution of 0.001° was achieved corresponding to a diameter resolution of 1 micron for an object diameter of 300 mm. Any movements of the device in the plane of the paper of FIG. 1 will not cause any errors. It will shift the position of beams 3' and 5' but the phase will not change, since directional filters 9 and 10 are not sensitive to lateral shifts. Any non-orthogonality of the scan relative to the axis of cylinder 18 will cause an error proportional to the cosine of the angle. This error is known as "cosine error" and is no different for this device than for any other measuring device such as a micrometer. Horizontal lines can be drawn on mirror 7 as a visual alignment aid for holding the device perpendicular to the axis of cylinder 18, since reflected beam 3' forms a visible horizontal line when using a visible wavelength for laser diode 1. By the way of example, laser diode 1 emits 2 mw at 670 nm. It is also obvious that the directional filters 9 and 10 can be placed at angles of $+\alpha/2$ and $-\alpha/2$ relative to the ray normal to the surface of object 18 instead of the configuration shown in FIG. 1 of 0° and $\alpha$. The filters can not be placed at any arbitrary angle since the difference in reflectance angle for a given h will depend on the position of h relative to the center of the object, as can be seen from the condition that h does not start at the centerline but is displaced by $\Delta h$:

$$\frac{\alpha}{2} = \arcsin\left(\frac{h+\Delta h}{R}\right) - \arcsin\left(\frac{\Delta h}{R}\right) \neq \arcsin\frac{h}{R}$$

Therefore h has to be referenced to the centerline of the object. This distinguishes the present invention from curvature gages.

What is claimed is:

1. A method for non-contact measurement of the diameter of a cylindrical object comprising of the following steps:
   Scanning the surface of said object with a light beam in a direction orthogonal to the axis of said object;
   Intercepting the reflection of said light beam from said object using at least two highly directional light detectors set at a fixed angle relative to each other;
   Calculating the diameter of said object based on the relationship between the diameter and the amount said light beam has to scan across said object to change the direction of said reflection by said fixed angle.

2. A method for non-contact measurement of the diameter according to claim 1, wherein said scan is of constant velocity and the amount said light beam scanned across the measured object is measured by measuring the phase shift between the output signal of said directional detectors.

3. An apparatus using the method of claim 1, wherein the means of scanning the surface of said object consist of a telecentric scanner comprise of a motorized reflective polygon and a scan lens.

4. An apparatus using the method of claim 1 wherein said highly directional light detectors comprise of a stack of transparent sheets laminated together with a light absorbing layer separating every two transparent layers, said stack of laminations is followed by a light detector.

* * * * *